Dec. 4, 1923.                                                1,476,208
                        A. MENSIK
                     AUTOMOBILE JACK
                   Filed Dec. 19, 1922            3 Sheets-Sheet 2
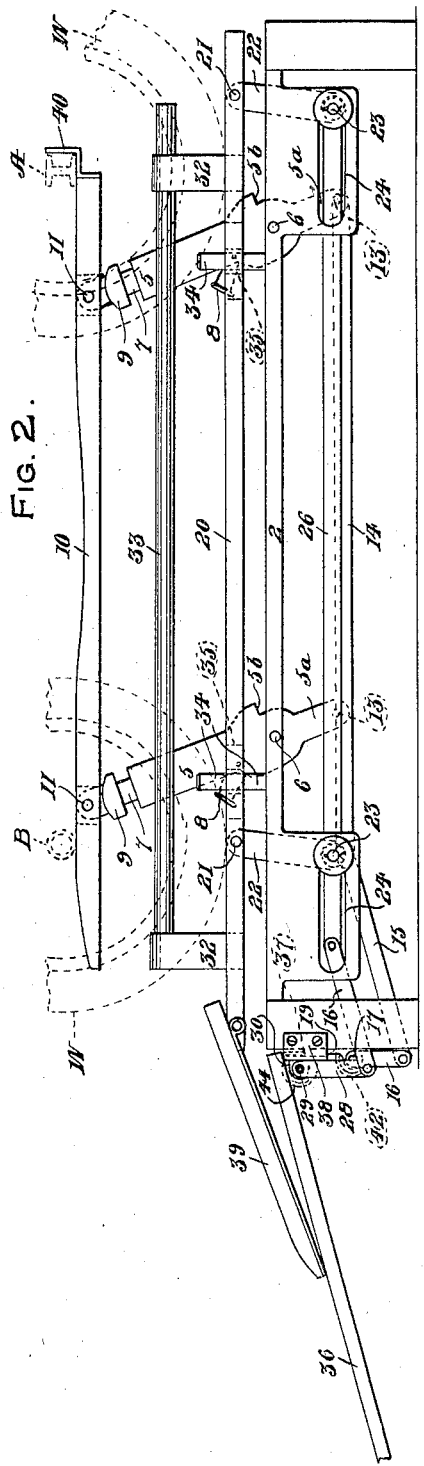
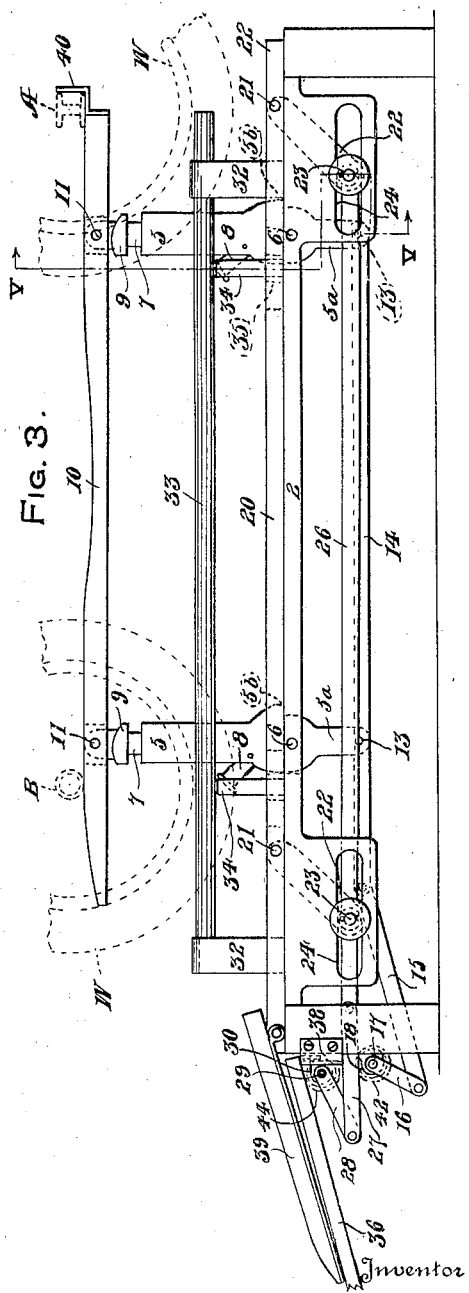
Inventor
A. Mensik
By
F. S. Bryant
Attorney Dec. 4, 1923.  1,476,208
A. MENSIK
AUTOMOBILE JACK
Filed Dec. 19, 1922   3 Sheets-Sheet 3
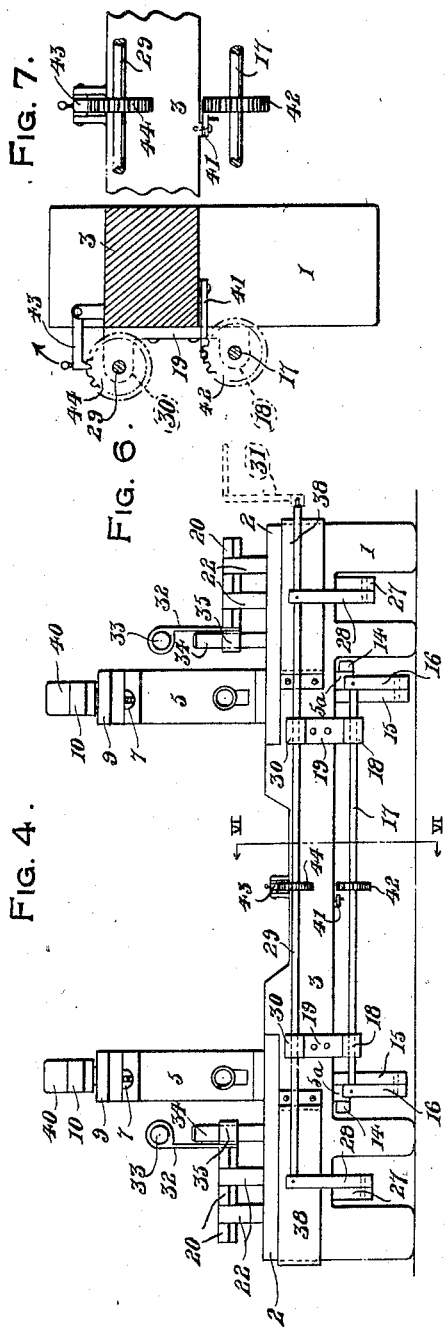
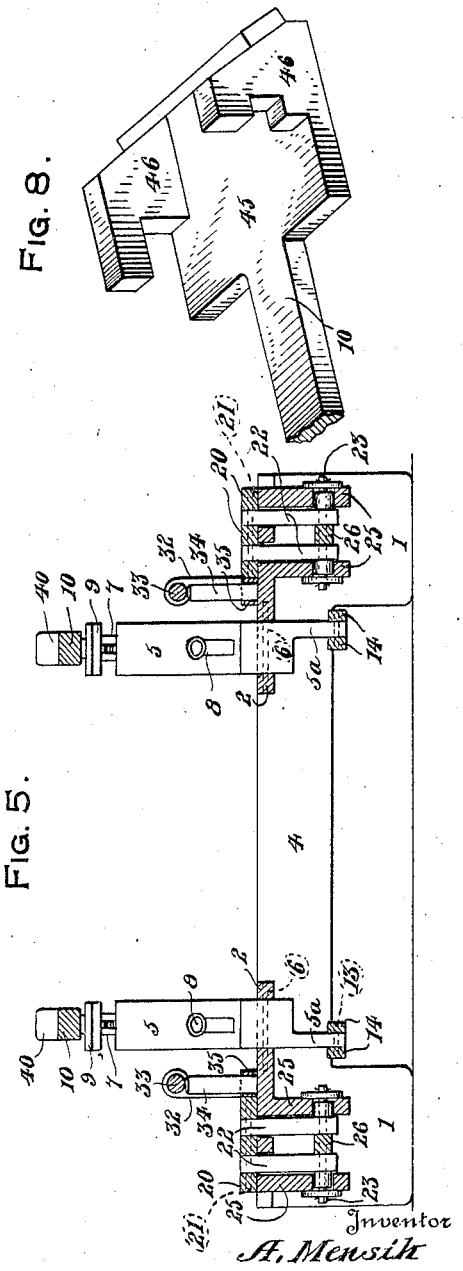

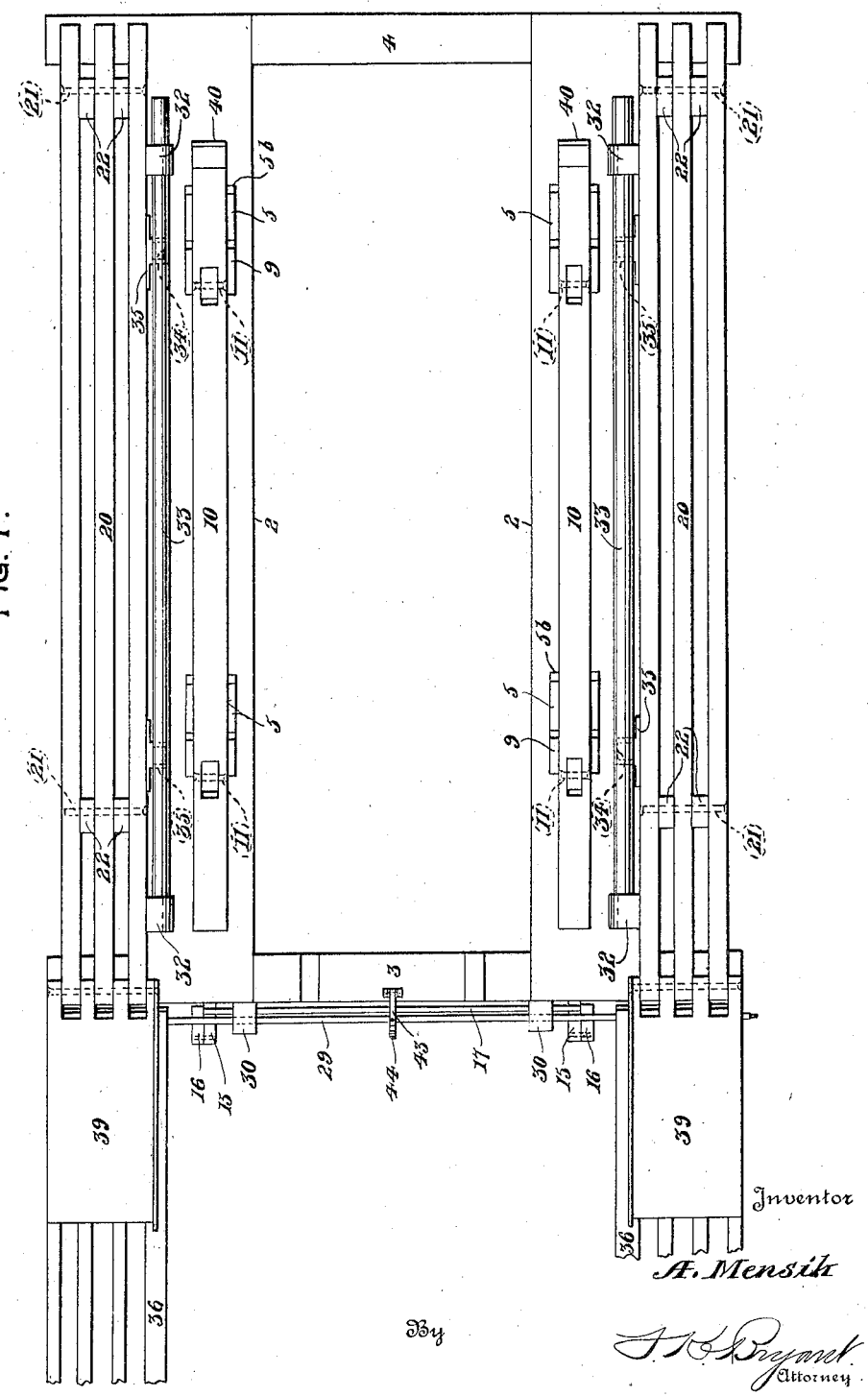

Patented Dec. 4, 1923.

1,476,208

UNITED STATES PATENT OFFICE.

ALBERT MENSIK, OF GORDON, TEXAS.

AUTOMOBILE JACK.

Application filed December 19, 1922. Serial No. 607,803.

*To all whom it may concern:*

Be it known that I, ALBERT MENSIK, a citizen of the United States of America, residing at Gordon, in the county of Palo Pinto and State of Texas, have invented certain new and useful Improvements in Automobile Jacks, of which the following is a specification.

This invention relates to certain new and useful improvements in automobile jacks wherein the entire automobile including the body and chassis is supported in an elevated position with the weight of the automobile removed from the wheels and tires, and is capable of use for jacking up an automobile during a period of storing the same, and may further be employed to permit ready access to the under frame or chassis for purposes of repair or the like.

The primary object of the invention is to provide an automobile jack wherein a frame structure having shiftably mounted axle supporting bars is adapted to have the axle supporting bars moved to an elevated position for jacking up the automobile by momentum of the latter during the mounting thereof upon the frame structure.

A further object of the invention is to provide in an automobile jack of the type above set forth, a pair of vertically shiftable wheel tracks or guides normally assuming an elevated position and adapted to be manually lowered when an automobile is mounted upon the axle supporting bars for spacing the tracks or guides from the tires with the automobile completely suspended in an elevated position with the weight removed from the wheels and tires.

With the above and other objects in view as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a top plan view, partly broken away of an automobile jack constructed in accordance with the present invention, Figure 2 is a side elevational view, partly broken away showing the wheel axle supporting bars in a lowered position and the wheel tracks or guides in an elevated position, Figure 3 is a side elevational view similar to Fig. 2 showing the axle supporting bars shifted to an elevated position with the wheel tracks or guides lowered, automobile wheels being illustrated by dotted lines, Figure 4 is a front elevational view of the jack with the inclined skids removed, Figure 5 is a cross sectional view of the jack showing the link and lever devices for raising and lowering the axle supporting bars and the wheel tracks or guides, Figure 6 is a detail sectional view taken on line VI—VI of Fig. 4 showing the latch devices for holding the axle supporting bars and wheel tracks in adjusted positions, Figure 7 is a fragmentary front elevational view of the latch devices illustrated in Fig. 6, and Figure 8 is a fragmentary perspective view showing a modified form of axle engaging block or head carried by the forward ends of the axle supporting bars.

Referring more in detail to the accompanying drawings, there is illustrated an automobile jack primarily intended for supporting an automobile in an elevated position with the wheels and tires thereof removed from the ground, the jack embodying a frame structure preferably of rectangular formation in plan view having corner legs 1 connected by longitudinally extending guide plates 2 and front and rear cross bars 3 and 4 respectively.

A pair of socketed standards, each designated by the reference numeral 5 is pivotally mounted as at 6 through each side plate 2, one socketed post being disposed adjacent each end of the plate as shown in Figs. 1 to 3. A rack bar 7 is slidably mounted in the upper end of each socketed standard 5, being raised and lowered by the ratchet device 8, each rack bar 7 carrying upon the upper end thereof a head 9 carrying a lug extension projecting into an opening formed in the longitudinally extending axle supporting bar 10 and pivotally mounted therein upon the pin 11, an axle supporting bar 10 being disposed above each side plate 2.

The lower ends 5ª of the tubular standards 5 are pivotally connected as at 13 to a shifting bar 14 that connects the tubular standards at each side of the frame as shown in Figs. 2 and 3, the forward end of each shifting bar 14 having a link connection 15 with a lever 16 that is fixed to the adjacent end of a shaft 17 that is journaled adjacent its end in the lower bearings 18 of the bracket plates 19 that are secured to the forward side of the forward cross bar 3 as clearly shown in Fig. 4.

A vertically shiftable track for the automobile wheels is associated with each side plate 2 outwardly of the tubular standards 5 and axle supporting bars 10, each track being of slotted bar construction as illustrated by the reference numeral 20, and more clearly shown in Figs. 1 and 4, the track 20 adjacent each end therof having pivotally connected thereto as at 21, depending link arms 22 freely extending through an opening in the adjacent side plate 2 and pivotally mounted at their lower ends upon a cross shaft 23 that extends through longitudinally extending slotted openings 24 formed in depending hanger plates 25 as shown in Figs. 2 and 3. A shifting bar 26 connects the shafts 23, the forward end of each shaft having a link connection 27 with a lever 28 that is fixed to the adjacent end of the shaft 29 journaled in the bearings 30 at the upper ends of the bracket plates 19 as shown in Fig. 4, one end of the shaft 29 being engaged by a crank handle 31 to effect rotation thereof. A guide for the automobile wheels is associated with each track 20, a perpendicular bracket 32 secured to the inner edge of each track supporting a horizontal rail 33 at their upper ends, while perpendicular guide pins 34 carried by the side plate 2 are enclosed by strap guides 35 carried by the tracks 20 as clearly shown in Figs. 4 and 5.

The approach to the jack includes inclined tracks 36 carrying flange extensions 37 at one end thereof to be removably mounted in strap bearings 38 as shown in Fig. 4, while a skid 39 is pivotally secured to the forward end of each track 20.

In the operation of the device, the tubular standards 5 normally occupy the forwardly tilted positions shown in Fig. 2, and an automobile is mounted on the jack by means of the inclined trackway 36 and skids 39, it being understood that the side tracks 20 are normally in the elevated position shown in Fig. 2, the automobile wheels W, illustrated by dotted lines in Figs. 2 and 3 riding over the tracks 20 and guided by the side rails 33 with the front and rear axles A and B positioned above the axle supporting bars 10. When the automobile reaches a point adjacent its limit of movement upon the jack, the forward axle A engages the angle bar 40 carried by the forward end of each axle supporting bar 10 for shifting the axle supporting bars and the tubular standards 5 upon their pivotal mountings 6 by momentum of the automobile to cause the tubular standards to assume the perpendicular position illustrated in Fig. 3, movement thereof being limited by the shoulders 5$^b$ formed on the tubular standards and engaging the upper surface of the side plates 2 as clearly shown in Figs. 2 and 3. When the axle supporting bars 10 are elevated to the position shown in Fig. 3, the laterally sliding latch lever 41 pivotally mounted upon the lower side of the front connecting bar 3 is moved into engagement with the toothed wheel 42 fixed upon the shaft 17 for holding the tubular standards 5 in a vertical position with the axle supporting bars 10 elevated, the front and rear axles A and B of the automobile being supported on the bars 10. The crank handle 31 is then employed for rotating the shaft 29 to move forwardly the longitudinally shifting bar 26 causing a lowering movement of the tracks 20 to assume the position shown in Fig. 3, the vertically swinging latch device 43 pivotally mounted upon the upper end of the forward cross bar 3 engaging the toothed wheel 44 fixed to the shaft 29 as clearly shown in Figs. 4, 6 and 7, the tracks 20 being lowered and spaced from the automobile wheels W with the automobile entirely supported on its axles A and B upon the axle supporting bars 10. It will therefore be seen that the entire weight of the automobile is removed from the wheels and tires permitting storage thereof for any period desired and also readily permitting access to the sub-structure or chassis for purposes of repair or the like. In lieu of the stop flanges 40, the forward ends of the axle supporting bars 10 as shown in Fig. 8, may have integrally formed therewith, blocks or heads 45 carrying perpendicularly extending shoulders 46 particularly designed for engagement with front axles of various types.

While there are herein shown and described the preferred embodiments of the present invention, it is nevertheless to be understood that minor changes may be made therein without departing from the spirit and scope of the invention as claimed.

What is claimed as new is:—

1. In an automobile jack, a frame, upwardly shiftable axle supporting bars mounted on the frame adapted to be elevated by momentum of an automobile during mounting thereof on the jack, and manually operable vertically shiftable tracks mounted on the frame adapted to be lowered when the bars are elevated.

2. In an automobile jack, a frame, upwardly shiftable axle supporting bars mounted above the frame, an abutment carried by the forward end of each bar and adapted to be engaged by the front axle of the automobile during mounting on the jack for vertically shifting the bars, and manually operable vertically shiftable tracks mounted on the frame adapted to be lowered when the bars are elevated.

3. In an automobile jack, a frame, upwardly shiftable axle supporting bars mounted on the frame adapted to be elevated by momentum of an automobile during mounting thereof on the jack, manually operable vertically shiftable tracks mounted on the frame adapted to be lowered when the bars are elevated, and manually operable devices for retaining the bars elevated and the tracks lowered.

4. In an automobile jack, a frame, upwardly shiftable axle supporting bars mounted above the frame, an abutment carried by the forward end of each bar and adapted to be engaged by the front axle of the automobile during mounting on the jack for upwardly shifting the bars, manually operable vertically shiftable tracks mounted on the frame adapted to be lowered when the bars are elevated, and manually operable devices for retaining the bars elevated and the tracks lowered.

5. In an automobile jack, a frame, upwardly shiftable axle supporting bars mounted on the frame adapted to be elevated by momentum of an automobile during mounting thereof on the jack, manually operable vertically shiftable tracks mounted on the frame adapted to be lowered when the bars are elevated, and a longitudinal wheel guide rail carried by each track and movable therewith.

6. In an automobile jack, a frame, upwardly shiftable axle supporting bars mounted above the frame, an abutment carried by the forward end of each bar and adapted to be engaged by the front axle of the automobile during mounting on the jack for upwardly shifting the bars, manually operable vertically shiftable tracks mounted on the frame adapted to be lowered when the bars are elevated, and a longitudinal wheel guide rail carried by each track and movable therewith.

7. In an automobile jack, a frame, upwardly shiftable axle supporting bars mounted on the frame adapted to be elevated by momentum of an automobile during mounting thereof on the jack, manually operable vertically shiftable tracks mounted on the frame adapted to be lowered when the bars are elevated, manually operable devices for retaining the bars elevated and the tracks lowered, and a longitudinal wheel guide rail carried by each track and movable therewith.

8. In an automobile jack, a frame, upwardly shiftable axle supporting bars mounted above the frame, an abutment carried by the forward end of each bar and adapted to be engaged by the front axle of the automobile during mounting on the jack for vertically shifting the bars, manually operable vertically shiftable tracks mounted on the frame adapted to be lowered when the bars are elevated, manually operable devices for retaining the bars elevated and the tracks lowered, and a longitudinal wheel guide rail carried by each track and movable therewith.

9. In an automobile jack, a frame, upwardly shiftable axle supporting bars mounted on the frame adapted to be elevated by momentum of an automobile during mounting thereof on the jack, manually operable vertically shiftable tracks mounted on the frame adapted to be lowered when the bars are elevated, tubular standards pivotally mounted on the frame, and rack bars adjustable in the standards and having the axle supporting bars pivoted to the upper ends thereof.

10. In an automobile jack, a frame, upwardly shiftable axle supporting bars mounted above the frame, an abutment carried by the forward end of each bar and adapted to be engaged by the front axle of the automobile during mounting on the jack for vertically shifting the bars, manually operable vertically shiftable tracks mounted on the frame adapted to be lowered when the bars are elevated, tubular standards pivotally mounted on the frame, and rack bars adjustable in the standards and having the axle supporting bars pivoted to the upper ends thereof.

11. In an automobile jack, a frame, standards pivotally mounted on the frame, axle supporting bars carried by the upper ends of the standards, normally elevated vertically shiftable tracks mounted on the frame, longitudinally shiftable rods connected to the standards and tracks, a pair of shafts journaled transversely of the frame with which the rods are connected, the axle supporting bars being elevated by an automobile during mounting thereof on the jack and manually operable means for lowering the tracks.

12. In an automobile jack, a frame, standards pivotally mounted on the frame, axle supporting bars carried by the upper ends of the standards, normally elevated vertically shiftable tracks mounted on the frame, longitudinally shiftable rods connected to the standards and tracks, a pair of shafts journaled transversely of the frame with which the rods are connected, the axle supporting bars being elevated by an automobile during mounting thereof on the jack, manually operable means for lowering the tracks, and means associated with the shafts for holding the shifting rods immovable with the axle supporting bars elevated and the tracks lowered.

13. In an automobile jack, a frame, standards pivotally mounted on the frame, axle supporting bars carried by the upper ends of the standards, normally elevated vertically shiftable tracks mounted on the frame, longitudinally shiftable rods connected to the standards and tracks, a pair of shafts journaled transversely of the frame with which the rods are connected, the axle supporting bars being elevated by an automobile during mounting thereof on the jack, manually operable means for lowering the tracks, and inclined trackways and skids connected respectively to the forward ends of the frame and tracks.

14. In an automobile jack, a frame, standards pivotally mounted on the frame, axle supporting bars carried by the upper ends of the standards, normally elevated vertically shiftable tracks mounted on the frame, longitudinally shiftable rods connected to the standards and tracks, a pair of shafts journaled transversely of the frame with which the rods are connected, the axle supporting bars being elevated by an automobile during mounting thereof on the jack, manually operable means for lowering the tracks, means associated with the shafts for holding the shifting rods immovable with the axle supporting bars elevated and the tracks lowered, and inclined trackways and skids connected respectively to the forward ends of the frame and tracks.

In testimony whereof I affix my signature.

ALBERT MENSIK.